Patented Nov. 13, 1928.

1,691,517

UNITED STATES PATENT OFFICE.

ARMIN GOESCHKE, OF BASEL, SWITZERLAND, ASSIGNOR TO SOCIETY OF CHEMICAL INDUSTRY IN BASLE, OF BASEL, SWITZERLAND.

PROCESS FOR THE DYEING OF CELLULOSE ESTERS AND ETHERS.

No Drawing. Application filed November 4, 1926, Serial No. 146,283, and in Switzerland November 14, 1925.

The present invention relates to the dyeing of cellulose esters and ethers, such as acetyl cellulose and acetate silk. It comprises the new dyeing process and the material dyed with the new dyestuffs.

It has been found that the indophenols corresponding with the general formula:

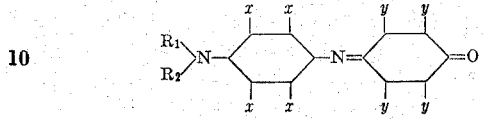

wherein at least one of the $y$'s stands for a halogen atom, and wherein the other $y$'s mean halogen atoms or hydrogen atoms, the $x$'s representing hydrogen atoms or substituents which contain at the most two carbon atoms, and $R_1$ and $R_2$ a hydrogen atom, alkyl, aryl and aralkyl residues, are very suitable for the production of fast tints on cellulose esters and ethers, as for instance acetate silk. On that material the above named indophenols yield, preferably in presence of a dispersing agent, such as sulfite waste liquor, condensation products from naphthalene sulfonic acids with formaldehyde, salts of lignin sulfonic acids, Turkey red oil etc., blue to green shades which are distinguished from those obtained with the indophenols, which have been hitherto recommended for the dyeing of cellulose esters, not only by their shade and their purity, but also by their fastness to light and storing. These results, which could not be forseen, constitute a considerable technical progress.

The indophenols coming into consideration in the invention may be obtained by several methods, for instance by simultaneous oxidation of a halogenized p-aminophenol and an aromatic amine having a free para-position, or by condensation of a halogenized p-nitrosophenol with an aromatic amine with free para-position, or by simultaneous oxidation of a suitable p-diamine with a halogenized phenol with free para-position.

As halogenized p-amidophenols there have to be considered especially the 2-chloro-4-amino-1-phenol, the 2.6-dichloro-4-amino-1-phenol, the 2.3.6-trichloro-4-amino-1-phenol, as aromatic amines with free para-position, aniline or o-toluidine, their N-alkyl derivatives, such as diethyl- and dimethylaniline, ethylbenzylaniline, N-ethylphenyl-glycine, N-methyldiphenylamine, meta-diamines and their derivatives, such as toluylenediamine, acetyl-meta-toluylenediamine, acetyl-meta-phenylenediamine, etc, as nitrosophenol derivatives, para-nitroso-ortho-chlorophenol, nitrosochlorokresols, as para-diamines, para-phenylene-diamine, asymmetric dimethyl or diethyl-para-phenylene-diamine, para-aminodiphenylamine, as halogenophenols, ortho-chlorophenol, 2.5-dichlorophenol, chloro-kresols, etc.

*Example.*

1 part of the indophenol from 2.6-dichloro-4-aminophenol and dimethylaniline corresponding probably with the formula:

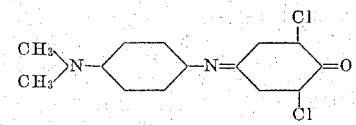

is made into a paste by trituration with 1 to 1½ parts of sulfite waste liquor of 30 to 50% strength. To this paste 2 parts of a hot soap solution of 6% strength are added and the whole is stirred and diluted with lukewarm water to 2000 parts.

In the dyebath thus prepared 100 parts of acetate silk are introduced and worked for ¾ of an hour while raising the temperature slowing to 70° C. The material is then rinsed and dried. There is obtained a turquoise blue having excellent properties of fastness.

In an analogous manner the other indophenols coming here into consideration may be employed.

Bluer shades are obtained generally with indophenols carrying in the phenolic nucleus only one chlorine atom, such as the indophenols from 2-chloro-4-amino-1-phenol and dimethylaniline or o-toluidine, etc., greener shades are also in general obtained with the indophenols from 2.6-dihalogen-4-amino-1-phenols, such as the indophenols from 2.6-dichloro-4-amino-1-phenol or 2.6-dibromo-4-amino-1-phenol and dimethylaniline or diethylaniline corresponding probably with the formula:

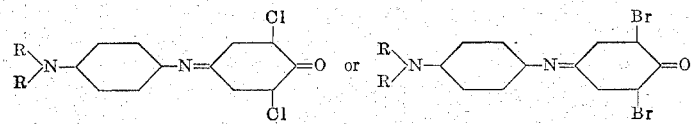

R meaning $CH_3$ or $C_2H_5$ (see first paragraph of the example), still greener shades are produced with the indophenols from further halogenized aminophenols, such as the products made from 2.5.6-trichloro-4-amino-1-phenol and diethylaniline corresponding probably with the formula:

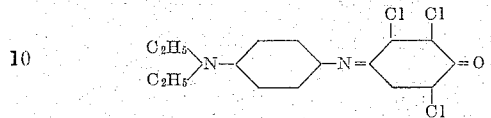

The nature and the position of the substituents in the diaminonucleus of the indophenol may furthermore have influence with the shade of the dyestuff. A pronounced green shade is obtained, for instance, with the indophenol made from 2.6-dichloro-4-amino-1-phenol and acetyl-meta-toluylene-diamine and corresponding probably with the formula:

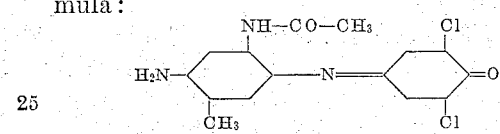

What I claim is:—

1. A process for the dyeing of a group of cellulose derivatives comprising cellulose esters and ethers which consists in dyeing this material with indophenols which may be represented by the general formula:

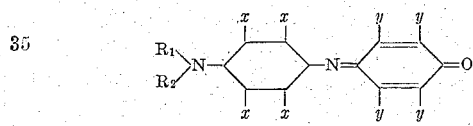

wherein at least one of the $y$'s stands for a halogen atom and wherein the other $y$'s mean halogen atoms or hydrogen atoms, the $x$'s representing hydrogen atoms or substituents which contain at the most two carbon atoms and $R_1$ and $R_2$ a hydrogen atom, alkyl, aryl or aralkyl residues.

2. A process for the dyeing of cellulose esters which consists in dyeing this material with indophenols which may be represented by the general formula:

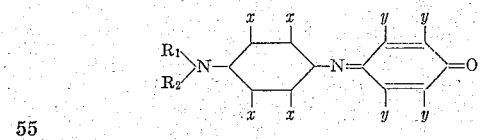

wherein at least one of the $y$'s stands for a halogen atom and wherein the other $y$'s mean halogen atoms or hydrogen atoms, the $x$'s representing hydrogen atoms or substituents which contain at the most two carbon atoms and $R_1$ and $R_2$ a hydrogen atom, alkyl, aryl or aralkyl residues.

3. A process for the dyeing of acetyl cellulose which consists in dyeing this material with indophenols which may be represented by the general formula:

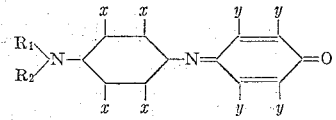

wherein at least one of the $y$'s stands for a halogen atom and wherein the other $y$'s mean halogen atoms or hydrogen atoms, the $x$'s representing hydrogen atoms or substituents which contain at the most two carbon atoms and $R_1$ and $R_2$ a hydrogen atom, alkyl, aryl or aralkyl residues.

4. A process for the dyeing of a group of cellulose derivatives comprising cellulose esters and ethers which consists in dyeing this material with indophenols which may be represented by the general formula:

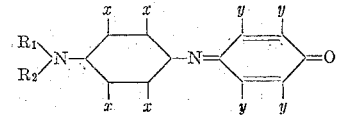

wherein at the most 3 of the $y$'s stand for a halogen atom and the remaining $y$'s for hydrogen atoms, the $x$'s representing hydrogen atoms or substituents which contain at the most two carbon atoms and $R_1$ and $R_2$ a hydrogen atom, alkyl, aryl or aralkyl residues.

5. A process for the dyeing of acetyl cellulose which consists in dyeing this material with indophenols which may be represented by the general formula:

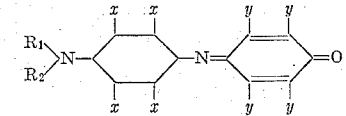

wherein at the most 3 of the $y$'s stand for a halogen atom and the remaining $y$'s for hydrogen atoms, the $x$'s representing hydrogen atoms or substituents which contain at the most two carbon atoms and $R_1$ and $R_2$ a hydrogen atom, alkyl, aryl or aralkyl residues.

6. A process for the dyeing of acetate silk which consists in dyeing this material with indophenols which may be represented by the general formula:

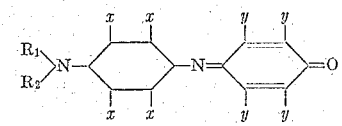

wherein at the most 3 of the $y$'s stand for a halogen atom and the remaining $y$'s for hydrogen atoms, the $x$'s representing hydrogen atoms or substituents which contain at the most two carbon atoms and $R_1$ and $R_2$ a hydrogen atom, alkyl, aryl or aralkyl residues.

7. A process for the dyeing of a group of cellulose derivatives comprising cellulose esters and ethers which consists in dyeing this material with the indophenols which may be represented by the general formula:

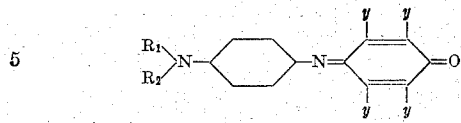

wherein at the most 3 of the $y$'s stand for a halogen atom and the remaining $y$'s for hydrogen atoms, $R_1$ and $R_2$ meaning a hydrogen atom, alkyl, aryl or aralkyl residues.

8. A process for the dyeing of acetyl cellulose which consists in dyeing this material with the indophenols which may be represented by the general formula:

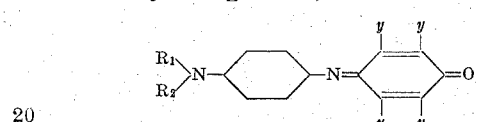

wherein at the most 3 of the $y$'s stand for a halogen atom and the remaining $y$'s for hydrogen atoms, $R_1$ and $R_2$ meaning a hydrogen atom, alkyl, aryl or aralkyl residues.

9. A process for the dyeing of acetate silk which consists in dyeing this material with indophenols which may be represented by the general formula:

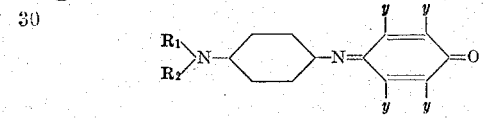

wherein at the most 3 of the $y$'s stand for a halogen atom and the remaining $y$'s for hydrogen atoms $R_1$ and $R_2$ meaning a hydrogen atom, alkyl, aryl or aralkyl residues.

10. A process for the dyeing of a group of cellulose derivatives comprising cellulose esters and ethers which consists in dyeing this material with the indophenols which may be represented by the general formula:

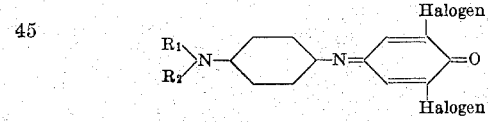

wherein $R_1$ and $R_2$ stand for a hydrogen atom, alkyl or aralkyl residues.

11. A process for the dyeing of acetyl cellulose which consists in dyeing this material with the indophenols which may be represented by the general formula:

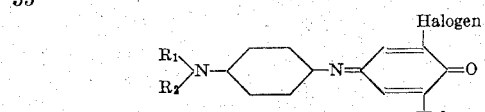

wherein $R_1$ and $R_2$ stand for a hydrogen atom, alkyl and aralkyl residues.

12. A process for the dyeing of acetate silk which consists in dyeing this material with the indophenols which may be represented by the general formula:

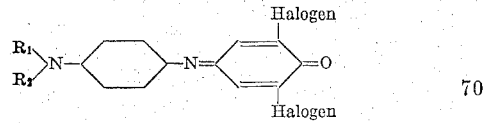

wherein $R_1$ and $R_2$ stand for a hydrogen atom, alkyl or aralkyl residues.

13. A process for the dyeing of a group of cellulose derivatives comprising cellulose esters and ethers which consists in dyeing this material with the indophenols which may be representd by the general formula:

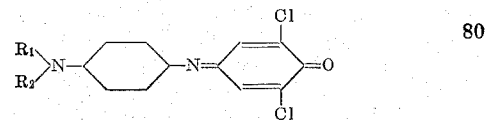

wherein $R_1$ and $R_2$ stand for a hydrogen atom, alkyl or aralkyl residues.

14. A process for the dyeing of acetyl cellulose which consists in dyeing this material with the indophenols which may be represented by the general formula:

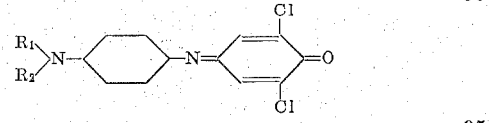

wherein $R_1$ and $R_2$ stand for a hydrogen atom, alkyl or aralkyl residues.

15. A process for the dyeing of acetate silk which consists in dyeing this material with the indophenols which may be represented by the general formula:

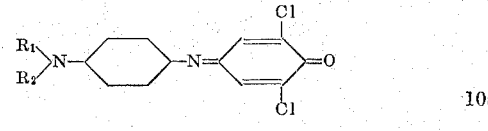

wherein $R_1$ and $R_2$ stand for a hydrogen atom, alkyl or aralkyl residues.

16. A process for the dyeing of a group of cellulose derivatives comprising cellulose esters and ethers which consists in dyeing this material with the indophenols which may be represented by the general formula:

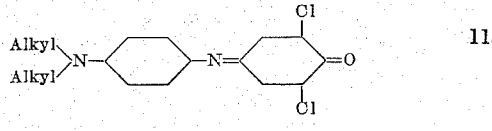

17. A process for the dyeing of acetyl cellulose which consists in dyeing this material with the indophenols which may be represented by the general formula:

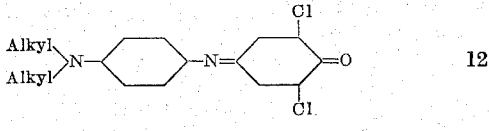

18. A process for the dyeing of acetate silk which consists in dyeing this material with the indophenols which may be represented by the general formula:

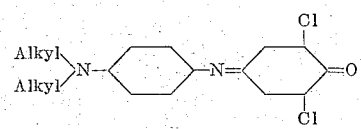

19. Organic substitution derivatives of cellulose dyed with the dyestuffs of claim 1.
20. Organic substitution derivatives of cellulose dyed with the dyestuffs of claim 4.
21. Organic substitution derivatives of cellulose dyed with the dyestuffs of claim 7.
22. Organic substitution derivatives of cellulose dyed with the dyestuffs of claim 10.
23. Organic substitution derivatives of cellulose dyed with the dyestuffs of claim 13.
24. Organic substitution derivatives of cellulose dyed with the dyestuffs of claim 16.

In witness whereof I have hereunto signed my name this 22d day of October 1926.

ARMIN GOESCHKE.